Aug. 23, 1927.
A. C. HOECKER
1,640,151
PACKING RING FOR PISTONS
Filed Jan. 15, 1923
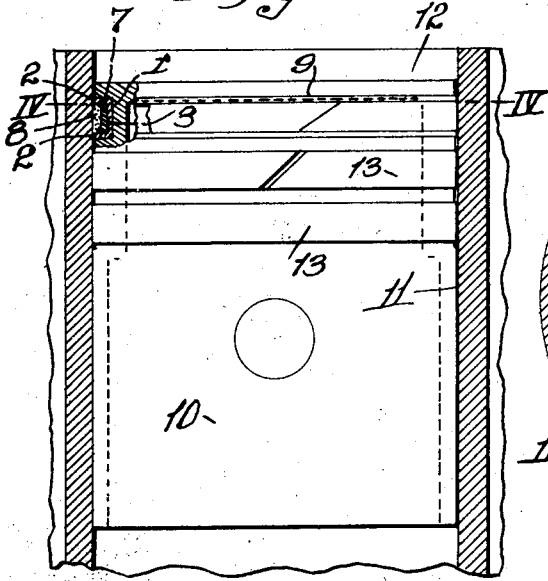
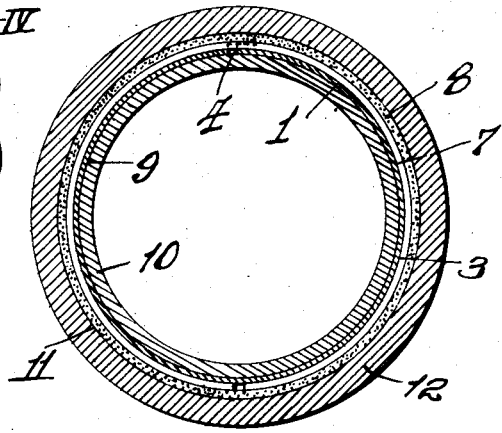
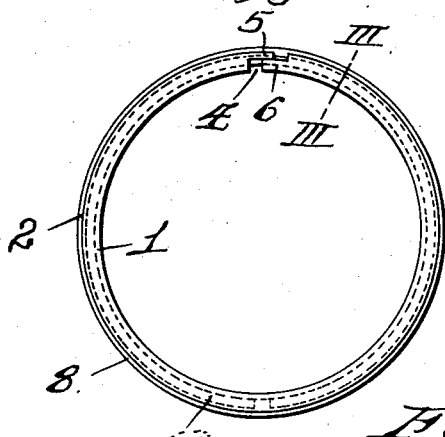
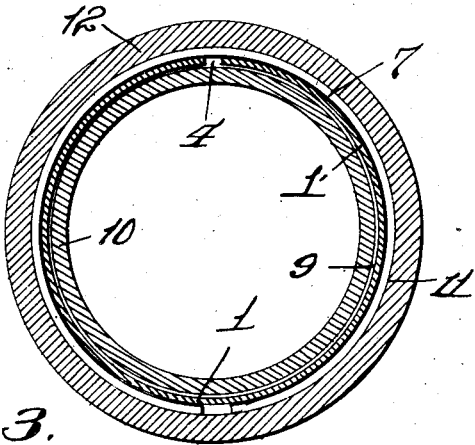
Inventor:
Albert C. Hoecker.
By H. G. Fletcher
atty.

Patented Aug. 23, 1927.

1,640,151

UNITED STATES PATENT OFFICE.

ALBERT C. HOECKER, OF COLLINSVILLE, ILLINOIS.

PACKING RING FOR PISTONS.

Application filed January 15, 1923. Serial No. 612,822.

This invention relates to an improvement in packing rings which are particularly adapted to the pistons of internal combustion motors, and has for its primary object the purpose of providing the ring with a wearing surface which is softer than the cylinder wall with which it is adapted to engage.

Another object of the invention is in providing a packing ring of more than one piece in which the outer ring is made of a softer material than its co-operable inner ring.

A further object of the invention is in providing a packing ring which is made of a relatively soft material and a co-operable resilient inner ring for forcing the soft material ring outwardly.

A still further object of the invention is in providing one of several rings of a piston of a material which is not as hard in consistence as the other rings, so that the softer material ring can readily adapt itself to a tight fitting relation with the cylinder wall while the other rings are slowly wearing themselves to a proper fitting with the cylinder wall.

Other and further objects will appear in the specification and be specifically pointed out in the appended claims, reference being had to the accompanying drawings, exemplifying the invention, and in which:—

Figure 1 is a vertical section taken through a portion of a cylinder showing a piston mounted therein and bearing this improved packing ring.

Figure 2 is an end elevation of this improved packing ring.

Figure 3 is an enlarged transverse section of the packing ring taken on the line III—III of Fig. 2.

Figure 4 is a horizontal section taken on the line IV—IV of Fig. 1.

Figure 5 is a horizontal section similar to Fig. 4 showing the application of the packing ring without the softer material ring being in the assembly.

This improved packing ring is comprised of a base ring 1 having a pair of cylinder wall engaging portions 2 and provided with a groove or recess 3 therebetween, said ring being trans-split as designated at 4 and having overlapping portions 5 and 6.

The base ring 1 is constructed of resilient metal and mounted within the groove 3 thereof is a steel ring 7 which is also resilient and tending to expand outwardly.

Mounted over the resilient ring 7 is a wearing ring 8, said ring 8 being made of a material which is softer than the material of the cylinder wall with which the wearing ring is to co-operate, said wearing ring 8 being preferably made of a material consisting of an interweaving of fabric, asbestos and copper.

When the rings 1, 7 and 8 are mounted together as just described thereby providing a complete packing ring or packing agent, the base ring 1 containing the rings 7 and 8 is mounted within the uppermost piston ring recess 9 of a piston 10.

This improved packing ring is designed to be used as one of a group or set of piston rings, for in the use of new packing rings which may be either used as replacement or form part of a new motor, it has been found that it is some time before the new packing rings adapt themselves to a proper working relation with the cylinder wall.

With the use of this improved packing ring and when mounted uppermost as shown in Fig. 1, the softer material wearing ring 8 will readily conform to or adapt itself to the scorings of the cylinder wall 11 of the cylinder 12 long before the new packing rings 13 have adapted themselves to a proper wearing relation with the cylinder wall 11.

As the wearing ring becomes worn, the expanding ring 7 will constantly press outwardly against the ring 8 thereby tightly engaging said ring 8 against the cylinder wall.

Long before the wearing ring 8 has become worn out, the packing rings 13 which may be made of material lasting much longer than the wearing ring 8, will have become properly fitted and adapt a working relation with the cylinder, and in the event that the packing ring 8 fully wears out, the expanding ring 7 will eventually engage the cylinder wall and bear thereagainst, as shown in Fig. 5 and serve as a packing agent itself.

In addition to the wearing ring 8 engaging the cylinder wall, the portions 2 of the base ring 1 will also engage the cylinder wall.

What I claim is:—

1. A packing element comprising a grooved base ring, a wearing ring made of a material softer than said base ring, and an expanding ring mounted within said groove adapted to bear outwardly against said wearing ring.

2. A packing element comprising a base ring, a wearing ring borne by said base ring made of a material which is softer than the cylinder wall with which said wearing ring is to co-operate, and resilient means for forcing said wearing ring outwardly.

3. A packing element for a piston provided with a wearing surface made of a material softer than the cylinder wall with which it is to co-operate, and resilient means borne by the element for bearing against the wearing surface.

ALBERT C. HOECKER.